US011958058B2

(12) United States Patent
Pitot et al.

(10) Patent No.: US 11,958,058 B2
(45) Date of Patent: Apr. 16, 2024

(54) SYSTEM FOR SORTING METALLIC OBJECTS

(71) Applicant: ETABLISSEMENTS RAOUL LENOIR, Moselle (FR)

(72) Inventors: Pierre Pitot, Meylan (FR); Gregory Durand, Hannonville-Suzemont (FR); Quentin Laurent, Grenoble (FR); Dominique Steichen, Fameck (FR); Cyril Brisebard, Grenoble (FR)

(73) Assignee: ETABLISSEMENTS RAOUL LENOIR, Moselle (FR)

( * ) Notice: Subject to any disclaimer, the term of this patent is extended or adjusted under 35 U.S.C. 154(b) by 0 days.

(21) Appl. No.: 18/194,304

(22) Filed: Mar. 31, 2023

(65) Prior Publication Data

US 2023/0311133 A1 Oct. 5, 2023

(30) Foreign Application Priority Data

Apr. 1, 2022 (FR) ...................................... 2203012

(51) Int. Cl.
*B03C 1/035* (2006.01)
*B03C 1/22* (2006.01)
*B03C 1/23* (2006.01)

(52) U.S. Cl.
CPC ................ *B03C 1/035* (2013.01); *B03C 1/22* (2013.01); *B03C 1/23* (2013.01); *B03C 2201/20* (2013.01)

(58) Field of Classification Search
CPC .. B03C 1/035; B03C 1/22; B03C 1/23; B03C 2201/20; B03C 1/0335; B03C 1/24
(Continued)

(56) References Cited

U.S. PATENT DOCUMENTS 4,238,323 A * 12/1980 Zakharova .............. B03C 1/035 209/636
5,823,354 A * 10/1998 Elkind .................. B03C 1/0335 209/636
(Continued)

FOREIGN PATENT DOCUMENTS

DE 102019000962 A1 * 8/2020
FR 2116430 A1 7/1972
(Continued)

OTHER PUBLICATIONS

French Search Report recieved for FR Application No. FR2203012 dated Nov. 17, 2022, 2 pgs.
(Continued)

*Primary Examiner* — Gene O Crawford
*Assistant Examiner* — Muhammad Awais
(74) *Attorney, Agent, or Firm* — Merchant & Gould P.C.

(57) ABSTRACT

A system for sorting metallic objects by magnetic separation has an electromagnetic core. The electronic core includes at least a first portion, a second portion, and a bottom. A sorting flap is arranged facing the electromagnetic core to fashion a circulation space for a conveyor of objects to be sorted from the first portion toward the second portion. The sorting flap includes a magnetic element arranged to form an air gap (E1) between the first portion and the sorting flap. The air gap forms a magnetic barrier opposing the passage of non-magnetic metallic objects, such that the objects are ejected from the conveyor. The second portion is arranged to ensure a return of the magnetic flux lines toward the first portion.

18 Claims, 5 Drawing Sheets

(58) Field of Classification Search
USPC .......................................................... 209/214
See application file for complete search history.

(56) References Cited

U.S. PATENT DOCUMENTS

| | | | | |
|---|---|---|---|---|
| 6,708,828 | B2 * | 3/2004 | Miles | B03C 1/22 209/225 |
| 2021/0339267 | A1 * | 11/2021 | Hottenstein | B07C 5/342 |

FOREIGN PATENT DOCUMENTS

| | | | |
|---|---|---|---|
| FR | 2447228 | A1 | 8/1980 |
| WO | 2017/044863 | A1 | 3/2017 |
| WO | 2017044863 | A1 | 3/2017 |
| WO | 2019/070539 | A1 | 4/2019 |
| WO | 2019070539 | A1 | 4/2019 |
| WO | WO-2019070539 | A1 * | 4/2019 |

OTHER PUBLICATIONS

French Search Report received for French Serial No. 2203012 dated Nov. 17, 2022, 8 pgs.

* cited by examiner

SYSTEM FOR SORTING METALLIC OBJECTS

CROSS-REFERENCE TO RELATED APPLICATION

This application claims benefit of Patent Application No. 2203012, filed, Apr. 1, 2022 in France, and which application is incorporated herein by reference. To the extent appropriate, a claim of priority is made to each of the above-disclosed applications.

FIELD OF THE INVENTION

This invention relates to a system for sorting metallic objects.

PRIOR ART

Magnetic objects, such as iron, steel and certain magnetic stainless steel alloys can be easily extracted with static magnetic fields then be recycled.

The sorting and collection of the non-magnetic metallic objects are carried out using an AC magnetic field, producing induced electrical currents in said objects, which are electrical conductors. These induced currents interact with this same surrounding magnetic field to give rise to electromagnetic forces, the direction of which is that of the decreasing magnetic field gradient. In devices for sorting by magnetic separation, these forces can be used to deviate electrically conductive objects, which are typically metallic.

A solution currently used to create an AC magnetic field is the pole wheel. This solution involves turning a pole wheel composed of an alternation of permanent magnets. The alternation of polarity of the rotationally driven magnets creates a variable magnetic field which can reach several Teslas. Electrically conductive non-magnetic objects are driven in this rotating variable magnetic field and are accelerated with respect to the non-electrically conductive objects.

Such a system is described in the document FR 2116430. This system is functional for sufficiently large aluminum parts which are light and sufficiently conductive. However, the mechanical construction of said system entails a limitation on the frequency of the magnetic field. For this reason, said system does not make it possible to sort materials which are insufficiently electrically conductive and too dense such as a magnetic stainless steel and has difficulty sorting materials which are highly conductive and too dense such as copper. It also poses considerable problems of reliability and safety, particularly in the case of an emergency shutdown, due to the inertia of the pole wheel of high mass.

Another solution is to use a conveyor passing above the air gap of an electromagnet supplied with an AC electrical current. Such a system is described in document WO2017/044863. The principle is to use electric eddy currents induced in objects in the presence of the inhomogeneous AC magnetic field to create electromagnetic forces, the direction of which is the gradient of the magnetic field.

The magnetic energy $E_{mag}$ of the system amounts to $$E_{mag}=\frac{1}{2}*HBV$$

H being the magnetic excitation, B the magnetic induction and V the volume of the excited exterior space corresponding to the air gap. The reactive power of the system corresponds to the expulsion then the generation of this magnetic energy at each period of operation, i.e. approximately 20 000 to 100 000 times per second.

This system therefore requires a very considerable reactive power to create the magnetic field at the air gap, particularly for large air gaps which are not delimited.

The efficiency of such a system can be increased by reducing the dimension of the air gap. However, when the air gap is small, the sorting area is also small and it therefore does not allow for the sorting of large volumes of objects, or objects of very different sizes. However, to be able to obtain an industrial application, it is necessary to sort several hundreds of kilograms of objects per hour with conveyor and sorting systems which can be up to several meters in width.

None of these devices takes into account the friction of the air which is specifically negligible for objects of large volume but are predominant for small particles, particularly during fall or rebound phases which are typically present during the sorting by an AC magnetic field. The friction of the air will affect the resultant of the forces undergone by the objects.

SUMMARY OF THE INVENTION

One aim of the invention is to make provision for a device for sorting non-magnetic metallic objects by magnetic separation making it possible to sort large volumes of products of any shape and/or size (waste, recyclable, powder etc.) and mixtures of objects of very different sizes. The invention also relates to the sorting of objects made of materials having a very high electric conductivity such as copper, or a very low electrical conductivity, such as a magnetic stainless steel.

For this purpose, the invention makes provision for a system for sorting metallic objects by magnetic separation, comprising:

- an electromagnetic core comprising:
  - at least a first portion including a winding,
  - a second portion, the second portion being wider than the first portion,
  - and a bottom connecting the first portion to the second portion, a sorting flap arranged facing said electromagnetic core such as to fashion, between the sorting flap and the electromagnetic core, a circulation space for a conveyor of objects to be sorted from the first portion toward the second portion,
- said sorting system being characterized in that the sorting flap comprises a magnetic element arranged in such a way as to form an air gap between the first portion and the sorting flap, said air gap forming a magnetic barrier opposing the passage of non-magnetic metallic objects, such that said non-magnetic metallic objects are ejected from the conveyor,
- the second portion being arranged between the bottom and a portion of the magnetic element of the sorting flap opposite the air gap to ensure a return of the magnetic flux lines toward the first portion.

Such a geometry makes it possible to optimize the distribution of the magnetic field for the ejection of the non-magnetic metallic objects. Furthermore, the sorting system is very reactive, particularly in the case of an emergency shutdown, and thus has advantages in terms of reliability and safety.

Preferably, the magnetic element of the sorting flap extends parallel to the conveyor.

Advantageously, the magnetic element of the sorting flap takes the form of a flat plate.

Advantageously, the sorting flap comprises at least one non-magnetic portion.

In certain embodiments, the magnetic element has an edge arranged facing the first portion in a direction transverse to the conveyor, said edge being beveled such as to form an inclined plane oriented in the direction of circulation of the conveyor moving away from the electromagnetic core. The sorting flap may further comprise at least one magnetic plate parallel to the beveled edge of the magnetic element, each plate being arranged facing the first portion to form a respective air gap forming an additional magnetic barrier opposing the passage of non-magnetic metallic objects.

Preferably, the non-magnetic portion of the sorting flap comprises a ramp to eject non-magnetic metallic objects extending over the magnetic element of the side opposite the electromagnetic core, said ejection ramp being coplanar with the beveled edge of the magnetic element.

Advantageously the beveled edge of the magnetic element is in recess with respect to a central region of the first portion in the direction of circulation of the conveyor.

Advantageously, the second portion comprises a winding and the number of turns of the winding on the first portion is greater than the number of turns of the winding on the second portion.

The surface of the at least one first portion opposite the bottom can have at least one chamfer along the air gap.

Preferably, the sorting system comprises one or more magnetic parts arranged between the magnetic element of the sorting flap and the second portion of the electromagnetic core to guide the magnetic field through these magnetic parts and thus minimize the path of the magnetic field lines in the air between the sorting flap and the second portion.

Advantageously, the at least one first portion and the second portion are made of ferrite, and/or the magnetic element of the sorting flap is made of ferrite.

The invention also relates to an installation for sorting a set of objects containing metallic objects, comprising

- a sorting system as described above, and
- a conveyor suitable for transporting the set of objects in the direction of the sorting system,
- said conveyor being arranged such as to traverse the sorting system between the electromagnetic core and the sorting flap, the magnetic barrier formed by the air gap between the first portion of the electromagnetic core and the sorting flap being suitable for ejecting non-magnetic metallic objects, and
- a collecting system arranged to collect the ejected non-magnetic metallic objects.

Preferably, the conveyor is a conveyor belt or a slide.

Advantageously, the sorting installation further comprises a hermetically sealed area arranged above at least the conveyor and the sorting flap, and a depressurization device arranged in such a way as to create, in said area, a movement of air suitable for orienting the non-magnetic metallic objects ejected by the magnetic sorting system in a predefined direction.

In certain embodiments, the sorting installation comprises a system for cooling the electromagnetic core.

The invention also relates to a method for sorting metallic objects, comprising

- the transporting of a set of metallic objects in an installation as described above,
- the ejection of the non-magnetic metallic objects by the magnetic barrier, the passage of the non-metallic objects through the air gap between the first portion of the electromagnetic core and the sorting flap.

BRIEF DESCRIPTION OF THE FIGURES

Other features and advantages of the invention will become apparent from the following detailed description, with reference to the appended drawings, wherein.

DETAILED DESCRIPTION OF INVENTION

Overview of the System

Figure 1:
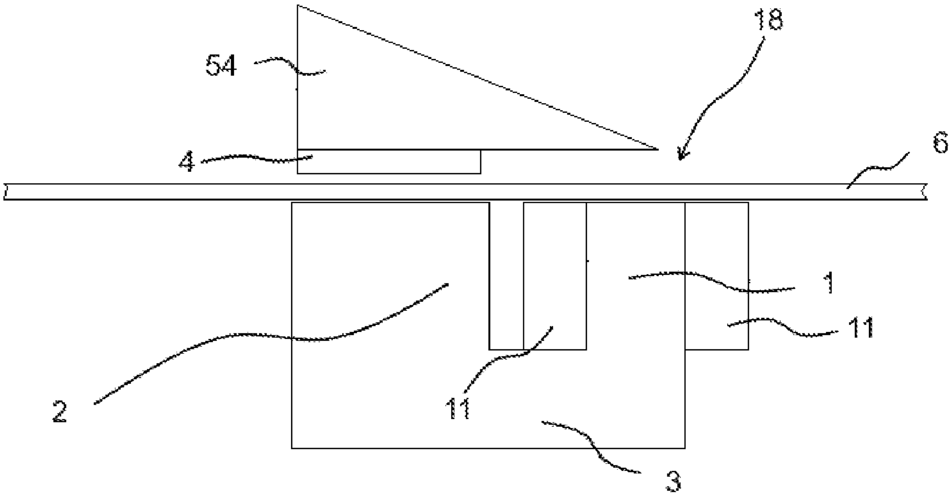
FIG. 1 a schematic section view of the principle of ejection of the conductive particles with a sorting flap forming part of the magnetic circuit
Figure 2:
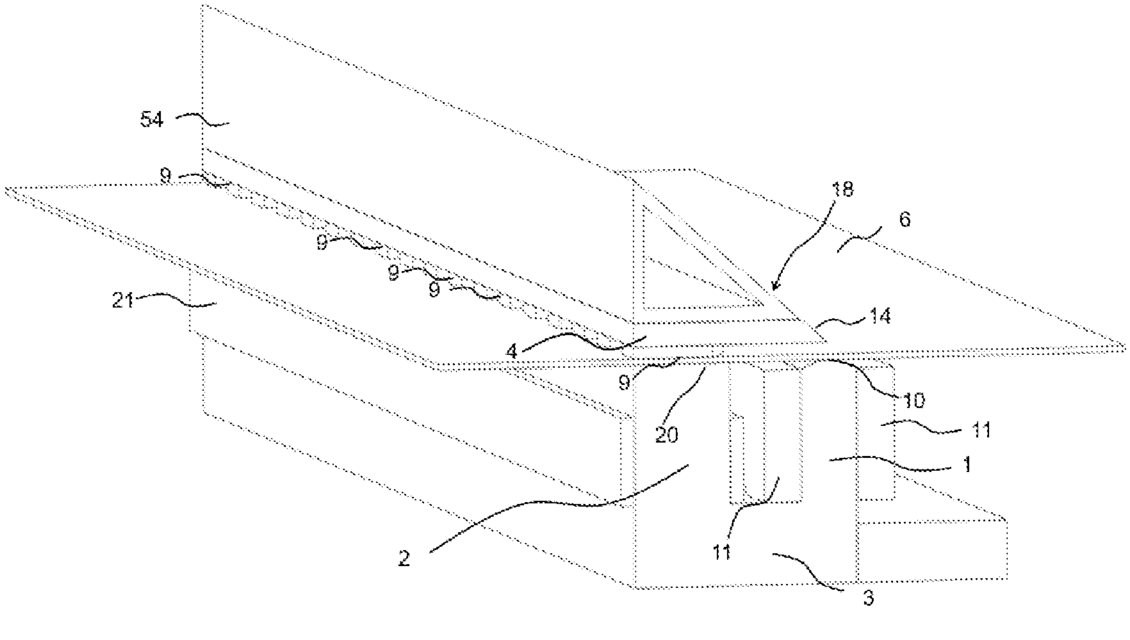
FIG. 2 illustrates a system of ejection over a great width for sorting large quantities of objects.

FIGS. 1 and 2 illustrate a system for sorting non-magnetic metallic objects by magnetic separation according to the invention.

The system makes it possible to collect, for example, metallic objects in waste such as metals in household or industrial waste and crushed products for recycling such as windows, wooden pallets, wire or glass. Another application is the transformation of food grains or pharmaceutical powders, which may contain non-ferrous conductive metals to be removed.

The size of said objects can vary very widely according to the application. The size of the objects (understood as being their largest dimension) may be between 0.1 mm to 10 cm in at least two directions.

The sorting system comprises an electromagnetic core comprising a first portion 1, a second portion 2 wider than the first portion, and a bottom 3 connecting the first portion to the second portion. Advantageously, the portions 1 and 2 and the bottom 3 are of basically parallelepipedal shape, assembled in a U shape. In certain embodiments, the portions 1 and 2 and/or the bottom may be curved and/or inclined, thus forming a core, the section of which can be, illustratively and without limitation, of circular or triangular shape.

The first portion 1 of the core includes a winding 11. In certain embodiments, the second portion 2 comprises another winding 21. Preferably, the number of turns of the winding 11 on the first portion 1 is greater than the number of turns of the winding 21 on the second portion 2. Each winding is made of electrically conductive wire. Preferably, the winding is made of copper wire including an electrical insulator, or made of copper tube. The number of turns and Amperes of the winding, also known as the number of Ampere-turns, is configured to supply a magnetic induction near the saturation induction of the magnetic circuit, i.e. approximately 300 mT for a ferrite.

Advantageously, the electromagnetic core further comprises a cooling system. Such a cooling system can, illustratively and without limitation, including a cooling plate, a heat dissipator or an inflatable seal filled with a coolant, for example water.

The system further comprises a sorting flap arranged facing said electromagnetic core. Said sorting flap comprises a magnetic element 4 arranged in such a way as to form an air gap E1 between the first portion 1 and the sorting flap. The magnetic element of the sorting flap extends all the way to an area in proximity to the upper face 20 of the second portion 2.

Preferably, the magnetic element 4 of the sorting flap is made of soft ferrite, of a nanocrystalline magnetic composite or of a compressed iron powder with an electrical insulator. The sorting flap can further include one or more non-magnetic portions.

Advantageously, the magnetic element of the sorting flap takes the form of a flat plate extending from the air gap E1 all the way to an area in proximity to the upper face 20 of the second portion 2.

The magnetic part of the sorting flap and the core thus form a magnetic circuit comprising a space for the circulation of objects to be sorted between the sorting flap and the core. One thus defines an area of entrance of the objects into the air gap E1, and an area of exit of the non-metallic objects between the sorting flap and the surface opposite the second portion 2 of the core 3.

The transportation of objects between the entrance area and the exit area is done by a belt 6 passing through said circulation space. The conveyor may comprise a conveyor belt closed on itself and circulating between the two portions and the sorting flap. Advantageously, the magnetic element 4 of the sorting flap extends in parallel to the conveyor belt.

Alternatively, the conveyor can be a slide or any other means for transporting objects.

Magnetic Circuit

The magnetic element of the sorting flap 4 has an edge 14 arranged facing the first portion 1 in a direction transverse to the conveyor 6. Preferably, said edge 14 is beveled such as to form an inclined plane, oriented in the direction of circulation of the conveyor moving away from the electromagnetic core.

In certain embodiments, the beveled edge of the magnetic element is aligned with a central region 10 of the first portion 1. In other embodiments, said beveled edge 14 is offset with respect to the central region 10 of the first portion 1 forward or backward in the direction of circulation of the conveyor 6.

Figure 4:
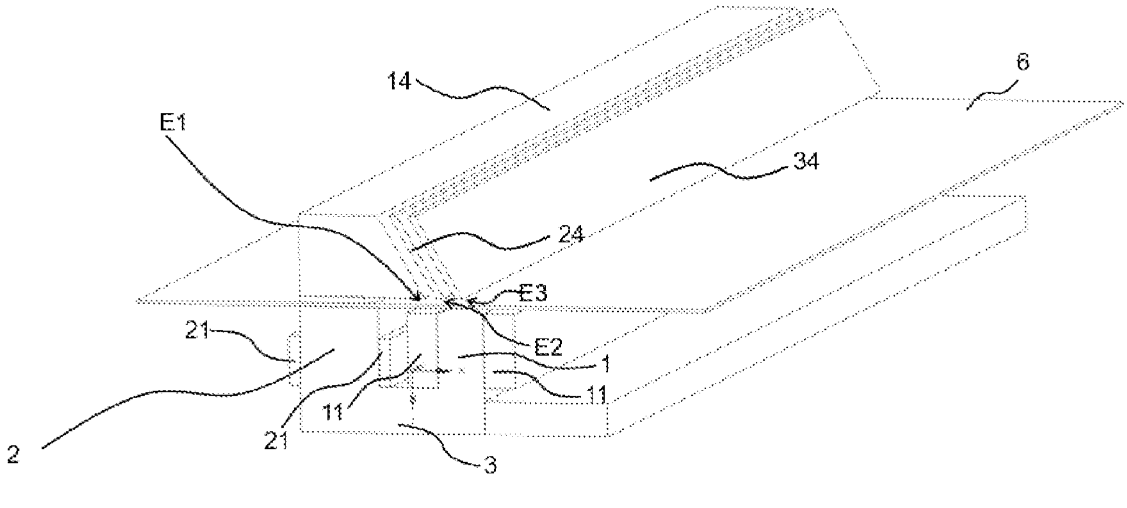
FIG. 4 illustrates a sorting system 4 comprising several plates parallel to the beveled surface of the flap.

In certain embodiments, with reference to FIG. 4, the sorting flap further comprises one or more magnetic plates 24, 34 parallel to the beveled edge 14 of the magnetic element of the sorting flap. Each plate is arranged facing the first portion 1 to form a respective air gap E2, E3. The number of plates 24, 34 and air gaps E2, E3 is indicated purely illustratively and without limitation. The number of plates 24, 34 is typically between 1 and 3 and can be higher in certain embodiments.

The non-magnetic portion of the sorting flap may comprise an ejection ramp 54. In this case, said ramp extends over the magnetic element of the sorting flap, on the opposite side of the electromagnetic core.

When the edge 14 is beveled forming an inclined plane, the ejection ramp can be coplanar with the beveled edge of the magnetic element or offset in a direction in the way of the circulation of the objects or be offset in the direction opposite the way of circulation of the objects. For a sorting system with given dimensions, the location of the ramp is chosen such as to find a trade-off between the position of the ramp with respect to the ejection area and a good closing of the magnetic circuit.

Advantageously, the core is composed of a material that conducts magnetic fields and is a poor enough conductor of electricity to avoid heating by induction. Preferably, the core is composed of a material having a high magnetic field saturation value (above 300 mT) and low magnetic losses (Hysteresis loop and by induced electrical current) at the frequency of the AC electrical current applied to the windings in order to produce a high density of the magnetic field inside the core.

For example, the magnetic core can be composed of a material having a relative magnetic permeability value $\mu_r$ between 10 to 100 or even more. Advantageously, the core is made of soft ferrite, for example of the type Mn—Zn CF297, 3C90 or a material having similar magnetic properties or else a magnetic saturation higher than this material. Alternatively, the core can for example be made of a nanocrystalline magnetic composite or made of a compressed iron powder with an electrical insulator. Such materials are for example marketed under the names MPP, 3F3, 3c90, Nanodust™ KAM or Nanodust™ KAH.

Preferably, the magnetic portion of the sorting flap and, where applicable, each plate 24, 34 is made of soft ferrite, made of a nanocrystalline magnetic composite or made of an iron powder compressed with an electrical insulator, as described for the magnetic core. The plates 24, 34 and the magnetic element 4 of the sorting flap can be composed of the same material or of different materials.

Figure 3:
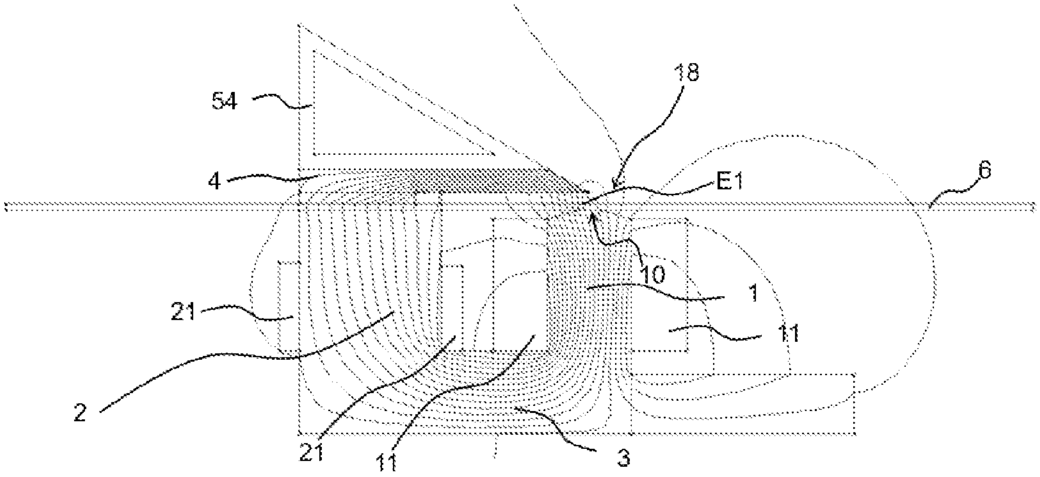
FIG. 3 is a schematic view of the magnetic field lines in a system for sorting waste according to the invention.

FIG. 3 illustrates the concentration of the magnetic field in a sorting system according to the invention. The maximum concentration of the magnetic field is located in the magnetic part 4 of the sorting flap and in the first portion 1 of the magnetic core. The maximum concentration of the magnetic field in air is located at the air gap E1. The maximum gradient of the magnetic field in air is located in an ejection area 18 in proximity to the air gap E1.

Said air gap E1 then forms an intangible magnetic barrier, opposing the passage of metallic objects, particularly including non-magnetic metallic objects.

Preferably, the surface of the first portion 1 facing the magnetic flap 4 is small, in order to increase the concentration of the magnetic field and the magnetic field gradient in an ejection area 18 in proximity to the air gap E1.

The surface 10 of the first portion opposite the bottom can include one or more chamfers 17_a_, 17_b_ arranged at angles between the surface 10 and the faces bearing the windings. Said chamfers extend along the air gap and reduce the surface of the first portion facing the sorting flap and thus increase the concentration of the magnetic field around the air gaps E1. Such chamfers moreover avoid the saturation of the magnetic element in the edges of the first portion 1.

The magnetic element of the sorting flap extends all the way to an area close to the surface 20 of the second portion 2 and is thus arranged such as to create a return magnetic field toward the second portion 2. The path of the magnetic field through the magnetic element of the sorting flap is preferred. The path of the magnetic field through the air is thus minimized. The magnetic element of the sorting flap is thus an integral part of the magnetic circuit. Such an arrangement increases the magnetic field and the gradient of the magnetic field in the area of ejection in proximity to the air gap E1 for a given power.

The magnetic field therefore exerts an attractive force between the magnetic circuit in the core and the sorting flap. Provision must therefore be made for mechanical retention of the ejection ramp to avoid the bending of the ramp under the effect of this attractive force.

The second portion 2 ensures a return for the magnetic field lines toward the first portion 1. It preferably comprises a large surface in order to distribute the magnetic field in a uniform and reliable manner, the magnetic flux remaining constant. Furthermore, the second portion 2 extends close to the magnetic element 4 of the sorting flap in order to minimize the extent of the magnetic field in the air.

Figure 7:
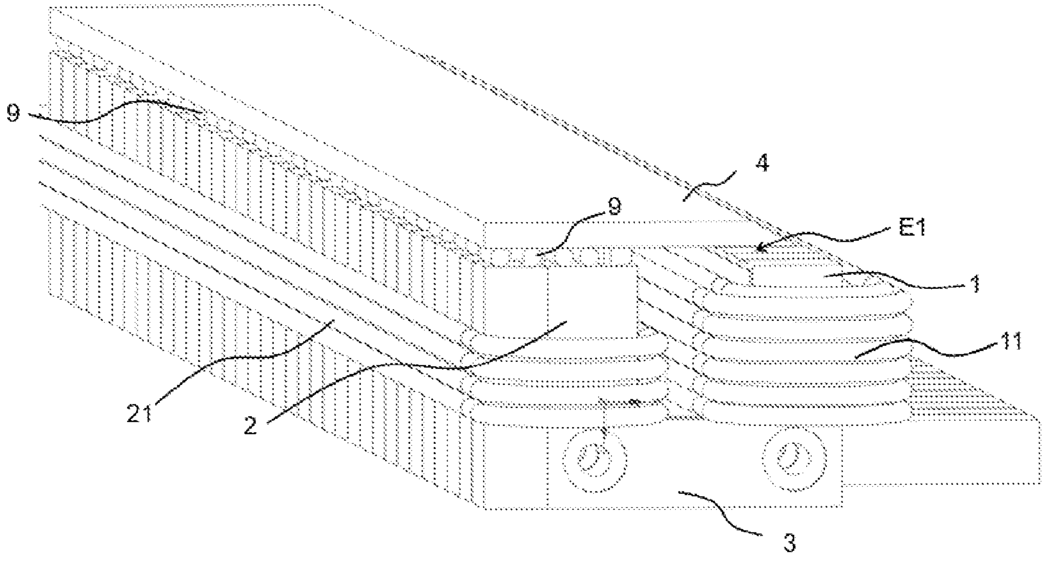
FIG. 7 illustrates a system for sorting waste including windings on both portions and a means for closing the magnetic circuit.
Figure 8:
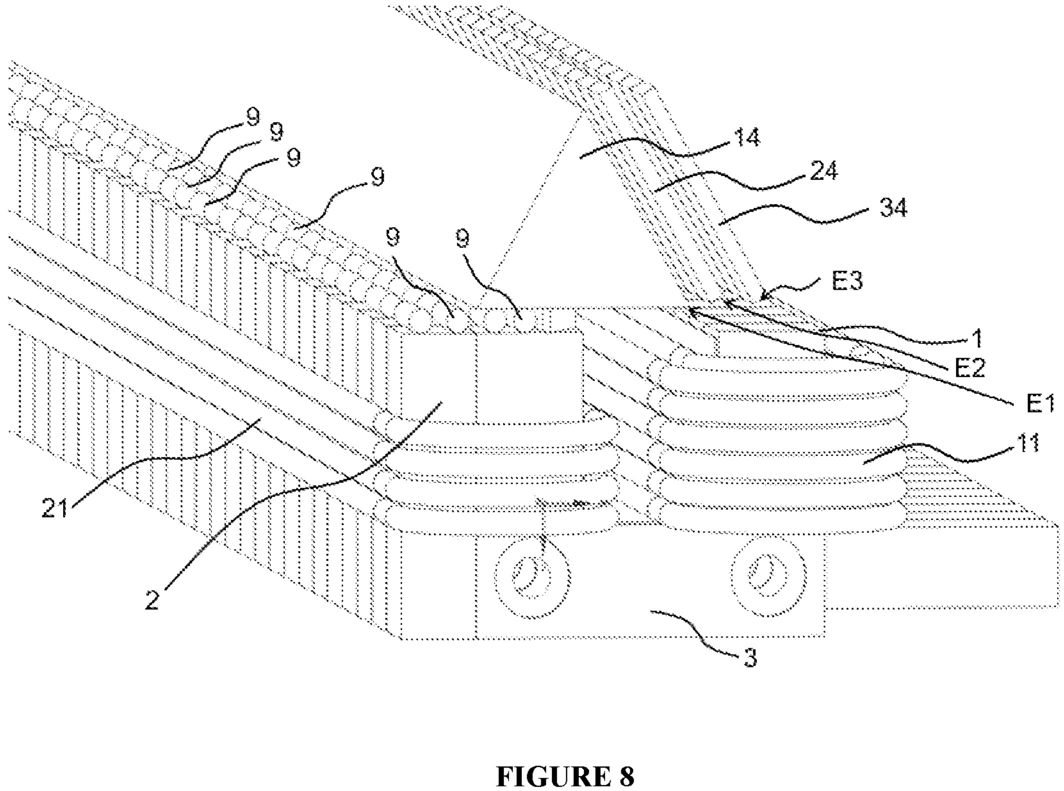
FIG. 8 illustrates a system for sorting waste including windings on both portions, several plates parallel to the beveled surface of the flap, and a means for closing the magnetic circuit.

Advantageously, as illustrated in FIG. 7 and FIG. 8, one or more magnetic parts 9 are arranged between the magnetic element of the sorting flap and the second portion 2 of the electromagnetic core. Said magnetic parts are arranged to guide the magnetic field and thus minimize the path of the magnetic field lines in the air between the sorting flap and the second portion 2. Furthermore, the geometry of the magnetic parts 9 allows the passage of the conveyor, and of the non-ejected objects transported on the conveyor under the flap.

The parameters of the system are chosen in the aim of reducing the reluctance R of the magnetic circuit, i.e. the ratio of the length l of the magnetic circuit and the product of the permeability μ and of the surface S:

$$R = \frac{l}{\mu * S} \quad (1)$$

In the sorting system, four areas of reluctance can be discerned. The first area corresponds to the magnetic core with, where applicable, magnetic parts 9 and/or plates 23, 24, The second area is the magnetic part of the sorting flap. In these areas, the surface S corresponds to the section of each respective part.

The third area is the ejection area, and the fourth area corresponds to the area above the second portion 2, ensuring the return or looping of the magnetic field. In the third and fourth area, the surface S is the section through which the lines of the magnetic field pass. Said surface S corresponds to the upper surfaces of the first portion 1 and the second portion 2 arranged facing the sorting flap.

In the first area, length l corresponds to the sum of the lengths of the first portion 1, of the bottom, of the second portion 2 and, where applicable, of the plates 23, 24 and/or of the magnetic parts 9 in the direction of the magnetic field lines. In the second area, the length is the length of the sorting flap.

In the third area, the length l corresponds to the width of the air gap. In the fourth area, the length l is the distance between the second portion 2 and the sorting flap plus, where applicable, the distances between the plates 23, 24 and the magnetic part of the sorting flap.

The magnetic permeability of the material μ is expressed by the product of the vacuum permeability $\mu_0$ and of the relative permeability $\mu_r$:

$$\mu=\mu_0*\mu_r$$

$\mu_0$ is a universal constant, the magnetic constant (or vacuum magnetic permeability), which has a value of $4\pi\times10^{-7}$ H/m. In air, the relative magnetic permeability $\mu_r$ is approximately equal to 1. The material of the magnetic circuit typically has a relative magnetic permeability of 10 to 100. The greater the magnetic permeability of an element, the lower the reluctance in this element. However, a higher relative magnetic permeability would cause an excessive drop in the magnetic field saturation value and would entail a loss of energy leading to considerable heating.

The number of Ampere-turns that determines the dimensions of the magnetic circuit is given by Hopkinson's law:

$$F=N\cdot I=R\cdot\varphi$$

φ being the magnetic induction flux. Said flux corresponds to the magnetic induction in a given surface. In the ejection area, the aim is to increase the magnetic flux φ without reducing the surface in question, to be able to sort a certain quantity and a certain volume of objects.

The reluctance $R_{totale}$ of the sorting system is the sum of four reluctances for the four areas of the sorting system, each reluctance being given by the equation (1) with the parameters of length l, surface S and magnetic permeability μ of the four respective areas:

$$R_{totale}=R1+R2+R3+R4$$

where $R_1$ is the magnetic reluctance of the magnetic core, $R_2$ is the magnetic reluctance of the magnetic element of the sorting flap, $R_3$ is the reluctance of the ejection area, and $R_4$ the reluctance in the area of return or looping of the magnetic field.

Among these four areas, the third and fourth area relate to a magnetic field in air. Due to the high relative magnetic permeability, typically between approximately 10 and 100, in the magnetic circuit, the reluctance in this circuit is low and negligible with respect to the reluctance in the third and fourth area in which the magnetic field is in the air.

The preceding equation can therefore be simplified:

$$R_{totale}=R3+R4$$

The aim is therefore to shorten the field length in these areas in the air, by coming as close as possible to the air gap at the upper surface of the second portion 2.

The reluctance R3 of the ejection area is related to the geometry of the system and is virtually impossible to modify.

Concerning the fourth area of return or looping of the magnetic field, the distance between the magnetic core and the magnetic element of the sorting flap is a minimum distance allowing the non-ejected objects to be evacuated. It is therefore imposed by mechanical considerations. However, the sorting system is preferably designed such that the surface S of this area is the largest possible.

One possibility to reduce the reluctance over the return path (looping) is to add magnetic parts 9 on the air gap, for example rollers, where applicable discontinuous, at once making it possible to guide the magnetic field in a path with high magnetic permeability. In addition, these parts 9 may make a mechanical movement facilitating the passage of the non-conductive and non-ejected elements.

The fact of limiting the magnetic field in the air and optimizing the passage of the magnetic field through magnetic elements of the system makes it possible to reduce the necessary reactive power.

The core geometry takes into account the magnetic field to obtain an area where the magnetic field is the most concentrated in the area of ejection of the metallic objects. This avoids right angles, particularly in the vicinity of the ejection area in order to avoid the saturation of the magnetic field in said angles.

Application of a Magnetic Field

When the electromagnetic core is supplied by an electrical current generator applying an AC electrical current to the windings 11, 21, an AC magnetic field is set up in the core, the magnetic element 4 of the sorting flap, and the air gap E1. Such an electrical current typically has an amperage of approximately 2400 A.turns, distributed for example over 20 turns at 120 A each. This current creates a magnetic field between 0.3 and 0.4 T in a ferrite core and approximately 0.1 T in the air gap E1. The number of wires and therefore of turns is limited by the space in the installation, the heating due to the electrical current, and any overvoltage problems that may exist.

The frequency is chosen as a function of the size and distribution of the sizes of the objects to be sorted. It is typically between 20 and 35 kHz and can go up to 150 kHz. In general, very high frequencies are applied when the objects to be sorted are smaller, and lower frequencies for larger objects to be sorted. However, a high frequency entails heating and considerable electrical losses. The inductance and the capacity will therefore be taken into account to determine the operating frequency.

Sorting Method

When a non-magnetic metallic object is placed in a unidirectional magnetic field on an axis, the value of which increases over a second axis perpendicular to the first axis, electric eddy currents inside the object are induced. The interaction of said electric eddy currents with the magnetic field generates electromagnetic forces (known by the name of Lorentz forces) perpendicular to the lines of constant magnetic field value. The force exerted on the metallic object in an area of high magnetic field is greater than the force on said object in an area of lower magnetic field. The magnetic field gradient leads to a resultant of the forces which pushes the metallic object in the direction of decreasing magnetic field.

The electrical currents induced in the objects depend on the electrical conductivity of the material, their shape and surface, but also the frequency of the magnetic field. Induced electrical currents have the same frequency as that of the applied magnetic field, and a skin effect occurs in the object. The higher the strength of the AC magnetic field, the more the electrical current will circulate at the object surface.

For fine particles this effect avoids the induced electric current being canceled by the induced electric current circulating in the opposite surface. By increasing the frequency of the magnetic field, the ejection of the fine particles is facilitated, since the forces are not attenuated by the cancellation of the induced electric currents.

When a set of objects to be sorted is transported toward the air gap by the conveyor 6 in the direction of the first portion 1, such an electric eddy current occurs in the non-magnetic metallic objects approaching the air gap. A metallic object can thus be ejected in a direction dependent on the gradient of the magnetic field.

Furthermore, gravity, any friction with the air and/or solid objects such as the ejection ramp, and air currents can exert other forces which can slow down the ejected objects or modify their trajectory and must be taken into account when designing the sorting system. The geometry of the sorting system must then be adapted to the additional forces exerted on the objects, making sure that the gradient of the magnetic field is close to its maximum value in the object ejection area, and that the direction of said gradient is oriented in the desired direction for ejection. For example, the position of the beveled edge of the sorting flap and, where applicable, the ejection ramp can be adjusted, by optimizing the width of the air gap and the position of said ramp with respect to the ejection area as a function of the gradient of the magnetic field in proximity to the air gap.

The metallic objects ejected at the level of the air gap are, where applicable, guided by the ejection ramp toward a system for collecting metallic objects. Non-metallic objects are not ejected at the level of the air gap, and can be collected on the conveyor in a later step.

Sorting Installation

The sorting and ejection of small objects, having for example a section of 2 mm×2 mm and a thickness of 0.1 mm, involves other technical restrictions due to air friction. The electromagnetic forces acting on small objects are, below a certain size as a function of the weight and geometry of the particles, negligible with respect to the air friction forces. The slight movement imposed by these electromagnetic forces is therefore not a sufficiently discriminating factor to sort and eject these objects, which all undergo a more or less random (non-deterministic) movement as a function of their density, their coefficient of penetration in air and random air movements in the sorting area.

Figure 6:
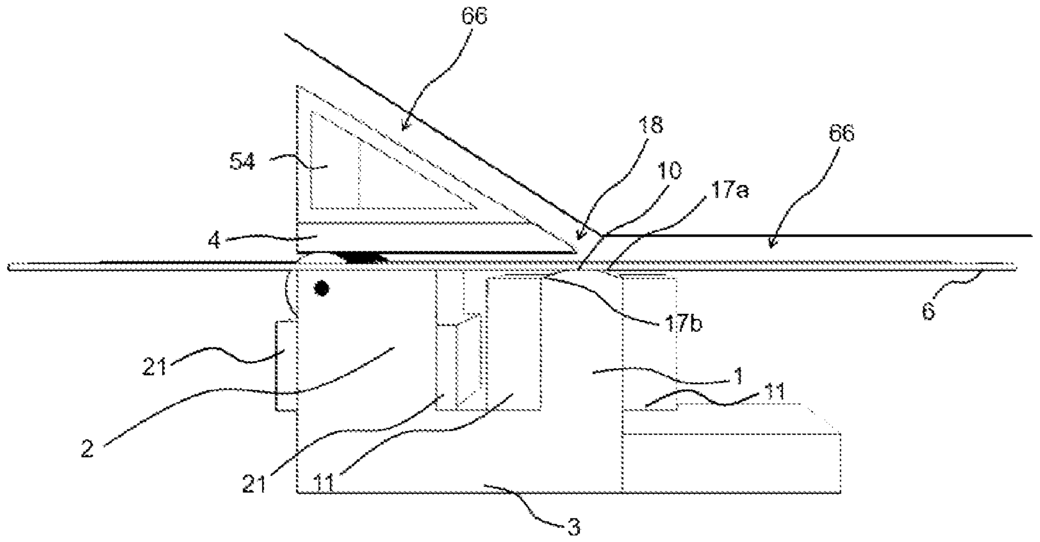
FIG. 6 is a schematic section view of a sorting installation comprising a partial vacuum system.

To sort such small objects, an attempt is therefore made to reduce or eliminate air friction. In this aim, a sorting installation for particles may comprise, with reference to FIG. 6, a hermetically sealed and/or depressurized area 66. This area 66 is arranged above at least one part of the conveyor and of the sorting flap. In this hermetically sealed and/or depressurized area 66, the air friction is at least partly canceled, resulting in a movement of free fall in a vacuum, where all the objects then take exactly the same trajectory. An electromagnetic force, even weak, is then a discriminating factor and makes it possible to sort objects of all dimensions.

Sorting System Comprising Several Air Gaps

One or more air gaps can be adapted to sort objects of different sizes and very different grain sizes.

Figure 5:
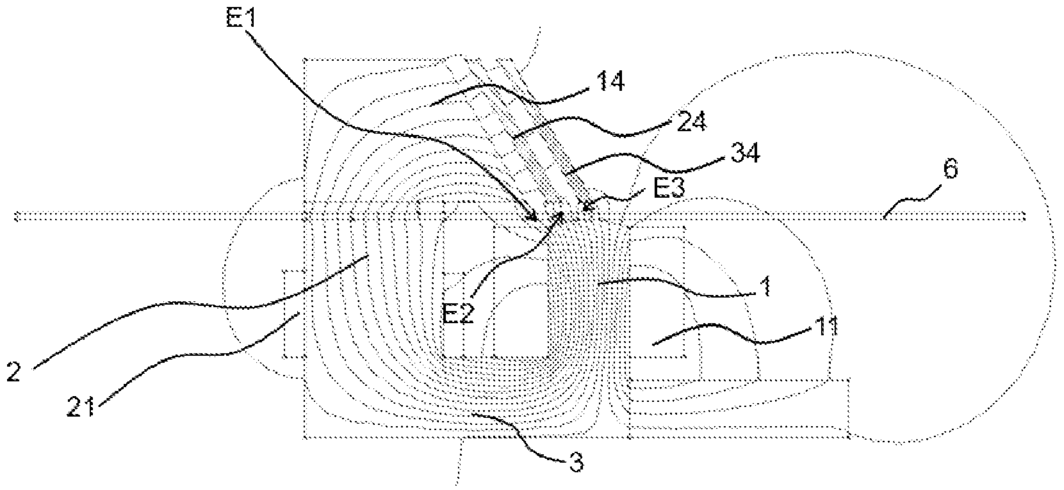
FIG. 5 is a schematic view of the magnetic field lines in a system for sorting non-magnetic metallic objects comprising several plates parallel to the beveled surface of the flap.

In certain embodiments, with reference to FIGS. 4 and 5, several air gaps E2, E3 are formed between the first portion 1 of the core and of the plates 14. 24 parallel to the beveled edge of the air gap E1.

Figure 9:
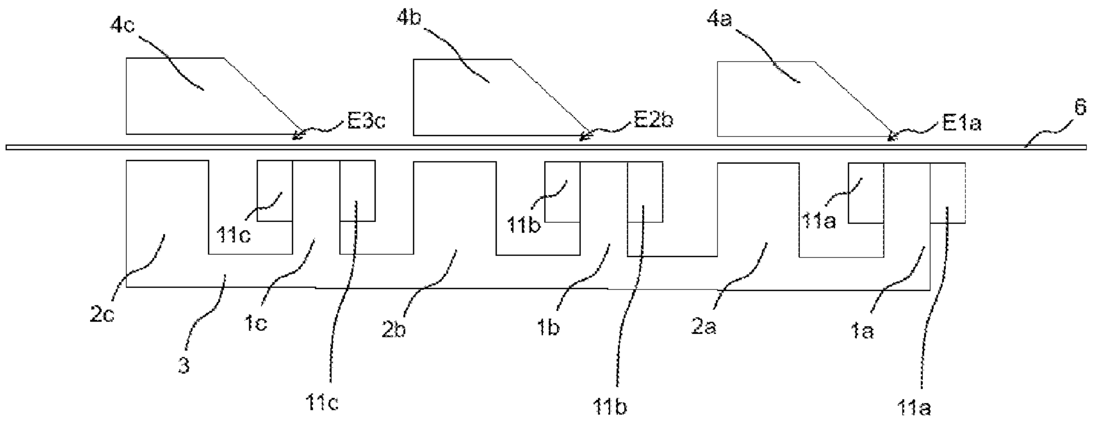
FIG. 9 illustrates a sorting system with several sorting flaps.

In other embodiments, with reference to FIG. 9, the core may comprise several first portions 1*a*, 1*b*, 1*c* and several second portions 2*a*, 2*b*, 2*c*. In this case, an air gap is formed between the first portion 1*a* and the edge 14 of the magnetic element of the sorting flap, and other air gaps E2*b*, E3*c* are formed between the first portions 1*b*, 1*c* and the respective magnetic elements 4*b*, 4*c*.

In the embodiments comprising additional air gaps E2, E3, E2*b*, E3*c*, the passage of the magnetic field through the air is limited for each air gap as described for the air gap E1.

With reference to FIG. 5, a strong gradient of the magnetic field in the air is located in a respective area around each air gap. The air gaps E2, E3, E2*b*, E3*c* thus each form an additional magnetic barrier opposing the passage of non-magnetic metallic objects.

The succession of the first portions 1*a*, 1*b*, 1*c* a has the aim of giving another impulse to the ejected objects when they start to undergo friction from the air.

In certain embodiments, the air gaps E1, E2, E3 or Ela, E2*b*, E3*c* are arranged at a distance of a few centimeters from one another. By way of illustrative and non-limiting example the air gaps are arranged at a distance of approximately 5 cm between the middle of each air gap. One thus obtains a succession of the electromagnetic forces ensuring a strong and more constant trajectory. Such an arrangement is useful to offset the air friction effects when all the objects to be sorted are of small dimensions, i.e. of a greatest dimension less than approximately 10 cm.

In other embodiments, several air gaps E1, E2, E3 or Ela, E2*b*, E3*c* are arranged at a distance of several tens of centimeters. Such an embodiment makes it possible to create a respective ejection area for each air gap. Each ejection area can thus have different settings. Such settings make it possible to eject objects of very different size, weight or shape in each ejection area corresponding to the respective air gaps. Such a configuration can be envisioned for example when the mixture of objects to be sorted is of a very inhomogeneous composition.

Another embodiment of a sorting system includes several magnetic circuits arranged in series, through which a common means of transport such as a conveyor 6 passes. The spacing of a sorting system includes several magnetic circuits arranged in series through which a common means of transport such as a conveyor 6 passes. The spacing and the size of the magnetic circuits are defined as a function of the size and the displacement speed of the objects, the density and intensity of the magnetic field.

In this way one can produce a sorting installation comprising several ejection areas suitable for sorting objects according to their shape, size and material. For example, such an installation may comprise an ejection area suitable for sorting voluminous objects, an ejection area for sorting stainless steel objects, and an ejection area for sorting objects of small size or other objects with distinct properties.

Advantageously, the installation further comprises a system for sorting magnetic objects including magnets, arranged upstream of the sorting system according to the invention, in order to expel magnetic objects before the passage of the mixture of objects into the sorting system.

In certain embodiments, the sorting flap can be excited by an AC current source in order to form an active part of the magnetic system. In this case, the AC current source is synchronous with the current source supplying the windings and oriented in the same direction.

The invention claimed is:

1. A system for sorting metallic objects by magnetic separation, comprising:

an electromagnetic core comprising:

at least a first portion including a winding, a second portion, the second portion being wider than the first portion, and a bottom connecting the first portion to the second portion, a sorting flap arranged facing said electromagnetic core to provide, between the sorting flap and the electromagnetic core, a circulation space for a conveyor of objects to be sorted from the first portion toward the second portion, wherein the sorting flap comprises a magnetic element arranged to form an air gap between the first portion and the sorting flap, said air gap forming a magnetic barrier opposing passage of non-magnetic metallic objects, such that said non-magnetic metallic objects are ejected from the conveyor, the second portion being arranged between the bottom and a portion of the magnetic elements of the sorting flap opposite the air gap to ensure a return of the magnetic flux lines toward the first portion.

2. The system as claimed in claim 1, wherein the magnetic element of the sorting flap extends parallel to the conveyor.

3. The system as claimed in claim 1, wherein the magnetic element of the sorting flap comprises a flat plate.

4. The system as claimed in claim 1, wherein the sorting flap comprises at least one non-magnetic portion.

5. The system as claimed in claim 1, wherein the magnetic element has an edge arranged facing the first portion in a direction transverse to the conveyor, said edge being beveled such as to form an inclined plane oriented in thea direction of circulation of the conveyor moving away from the electromagnetic core.

6. The system as claimed in claim 5, wherein the sorting flap further comprises at least one magnetic plate parallel to the beveled edge of the magnetic element, each plate being arranged facing the first portion to form a respective air gap forming an additional magnetic barrier opposing the passage of non-magnetic metallic objects.

7. The system as claimed in claim 5, wherein the sorting flap comprises at least one non-magnetic portion, and wherein the non-magnetic portion of the sorting flap comprises a ramp to eject non-magnetic metallic objects extending over the magnetic element of a side opposite the electromagnetic core, said ejection ramp being coplanar with the beveled edge of the magnetic element.

8. The system as claimed in claim 5, wherein the beveled edge of the magnetic element is in recess recessed with respect to a central region of the first portion (1) in the direction of circulation of the conveyor.

9. The system as claimed in claim 1, wherein the second portion comprises a winding and the number of turns of the winding on the first portion is greater than the number of turns of the winding on the second portion.

10. The system as claimed in claim 1, wherein a surface of the at least one first portion opposite the bottom has at least one chamfer along the air gap.

11. The system as claimed in claim 1, comprising one or more magnetic parts arranged between the magnetic element of the sorting flap and the second portion of the electromagnetic core to guide the magnetic field through the magnetic parts and minimize a path of the magnetic field lines in air between the sorting flap and the second portion.

12. The system as claimed in claim 1, wherein the at least one first portion and the second portion are made of ferrite.

13. The system as claimed in one of the preceding claims claim 1, wherein the magnetic element of the sorting flap is made of ferrite.

14. An installation for sorting a set of objects containing metallic objects, comprising:

the sorting system as claimed in claim 1, and a conveyor for transporting the set of objects in a direction of the sorting system, said conveyor being arranged to traverse the sorting system between the electromagnetic core and the sorting flap, the magnetic barrier formed by the air gap between the first portion of the electromagnetic core and the sorting flap being configured for ejecting non-magnetic metallic objects, and a collecting system arranged to collect the ejected non-magnetic metallic objects.

15. The installation as claimed in claim 14, wherein the conveyor is a conveyor belt or a slide.

16. The installation as claimed in claim 14, further comprising a hermetically sealed area arranged above at least the conveyor and the sorting flap, and a depressurization device arranged to create, in said area, a movement of air for orienting the non-magnetic metallic objects ejected by the magnetic sorting system in a predefined direction.

17. The installation as claimed in claim 14, comprising a system for cooling the electromagnetic core.

18. A method for sorting metallic objects, comprising:

transporting of a set of metallic objects in an installation as claimed in claim 14, ejecting the non-magnetic metallic objects by the magnetic barrier, passing the non-metallic objects through the air gap between the first portion of the electromagnetic core and the sorting flap.

* * * * *